(12) United States Patent
Dambrine

(10) Patent No.: US 10,913,687 B2
(45) Date of Patent: Feb. 9, 2021

(54) COMPOSITE MATERIAL PART

(71) Applicant: SAFRAN AIRCRAFT ENGINES, Paris (FR)

(72) Inventor: Bruno Jacques Gérard Dambrine, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 64 days.

(21) Appl. No.: 15/759,959

(22) PCT Filed: Sep. 15, 2016

(86) PCT No.: PCT/FR2016/052343
§ 371 (c)(1),
(2) Date: Mar. 14, 2018

(87) PCT Pub. No.: WO2017/046538
PCT Pub. Date: Mar. 23, 2017

(65) Prior Publication Data
US 2018/0257996 A1 Sep. 13, 2018

(30) Foreign Application Priority Data
Sep. 18, 2015 (FR) ...................................... 15 58797

(51) Int. Cl.
*C04B 35/83* (2006.01)
*C04B 35/80* (2006.01)
(Continued)

(52) U.S. Cl.
CPC .............. *C04B 35/83* (2013.01); *B64D 29/00* (2013.01); *C04B 35/80* (2013.01); *C04B 35/803* (2013.01);
(Continued)

(58) Field of Classification Search
CPC .... D10B 2505/02; D10B 5/02; B29C 66/721; B29C 70/48; C04B 2235/5252;
(Continued)

(56) References Cited

U.S. PATENT DOCUMENTS

2008/0206048 A1 8/2008 Coupe et al.
2010/0005780 A1 1/2010 Philippe et al.
(Continued)

FOREIGN PATENT DOCUMENTS

CN 101605978 A 12/2009
CN 102666277 A 9/2012
(Continued)

OTHER PUBLICATIONS

International Search Report as issued in International Patent Application No. PCT/FR2016/052343, dated Nov. 15, 2016.
(Continued)

*Primary Examiner* — Camie S Thompson
(74) *Attorney, Agent, or Firm* — Pillsbury Winthrop Shaw Pittman LLP

(57) ABSTRACT

A composite material part includes a fiber preform forming fiber reinforcement including a stack of at least two fiber plies, each of the fiber plies being made of an interlock weave three-dimensional fabric and each of the fiber plies having a number of warp yarn layers or a number of weft yarn layers that is greater than or equal to three; and a matrix present in the pores of the fiber preform.

8 Claims, 2 Drawing Sheets

(51) Int. Cl.
*B64D 29/00* (2006.01)
*B64C 1/00* (2006.01)

(52) U.S. Cl.
CPC .... *C04B 35/806* (2013.01); *B64C 2001/0072* (2013.01); *C04B 2237/385* (2013.01)

(58) Field of Classification Search
CPC .......... B64C 2001/0072; D03B 25/005; Y10S 427/10; F05D 2300/6012; F05D 2300/603; F01D 5/282; Y10T 29/49325; Y10T 29/49337; Y10T 428/24802
USPC ................ 428/292.1, 195.1; 427/249.2, 261; 156/48; 29/889.71, 889.23
See application file for complete search history.

(56) References Cited

U.S. PATENT DOCUMENTS

| | | | |
|---|---|---|---|
| 2010/0215953 A1 | 8/2010 | Boussu et al. | |
| 2011/0293828 A1* | 12/2011 | Eberling-Fux | D03D 25/005 427/249.2 |
| 2012/0055609 A1* | 3/2012 | Blanchard | B29C 70/24 156/89.11 |
| 2013/0017093 A1 | 1/2013 | Coupe et al. | |
| 2013/0089429 A1* | 4/2013 | Nunez | C04B 35/571 416/230 |
| 2016/0319931 A1 | 11/2016 | Ishikawa et al. | |

FOREIGN PATENT DOCUMENTS

| | | |
|---|---|---|
| EP | 1 961 923 A2 | 8/2008 |
| FR | 2 917 099 A1 | 12/2008 |
| FR | 2 939 130 A1 | 6/2010 |
| FR | 2 943 942 A1 | 10/2010 |
| FR | 2 970 898 A1 | 8/2012 |
| JP | 2016-211622 A | 12/2016 |
| WO | WO 91/01284 A1 | 2/1991 |
| WO | WO 2006/136755 A2 | 12/2006 |

OTHER PUBLICATIONS

Office Action as issued in European Patent Application No. 16785193.0, dated Mar. 13, 2020.

First Office Action as issued in Chinese Patent Application No. 201680054393.1, dated Jul. 21, 2020.

Wang, X., et al., "Developments in Research on 3D Braided Composites," ACTA Aeronauticaet Astronautica Sinica, (2010), vol. 31, No. 5, pp. 914-927.

Zeng, X., et al., "Geometrical modelling of 3D woven reinforcements for polymer composites: Prediction of fabric permeability and composite mechanical properties," Composites: Part A, vol. 56, (2014), pp. 150-160.

* cited by examiner

COMPOSITE MATERIAL PART

CROSS REFERENCE TO RELATED APPLICATIONS

This application is the U.S. National Stage of PCT/FR2016/052343 filed Sep. 15, 2016, which in turn claims priority to French Application No. 1558797, filed Sep. 18, 2015. The contents of both applications are incorporated herein by reference in their entirety.

BACKGROUND OF THE INVENTION

The invention relates to parts made of composite materials, and to methods of fabricating such parts.

A field of application of the invention is making structural parts out of composite material comprising fiber reinforcement and a resin matrix. Such parts are used in very many fields, and in particular in the field of aviation. A particular example is making turbine engine casings. The fiber reinforcing structure is densified with the resin matrix by any known means, e.g. by the resin transfer molding (RTM) method.

Another field of application of the invention is making parts out of composite material that is thermostructural, i.e. a material having mechanical properties that makes it suitable for constituting structural elements, and having the ability to conserve those properties at high temperatures. Thermostructural composite materials are typically carbon/carbon (C/C) composite materials having carbon fiber reinforcement densified with a carbon matrix, and ceramic matrix composite (CMC) materials having refractory fiber reinforcement (made of carbon or ceramic) densified with a ceramic matrix. Thermostructural composite material parts are used in particular in the fields of aviation and space. The fiber reinforcing structure may be densified with the matrix-constituting material by performing chemical vapor infiltration (VPI) or by using a liquid technique, as is well known. Densification by a liquid technique consists in impregnating the fiber structure with a liquid composition containing a precursor for the material constituting the matrix, typically a resin, with the precursor then being transformed by heat treatment.

It is known to use composite material parts made from a stack of pre-impregnated plies. In order to form parts of that type, it is possible initially to stack a plurality of fiber plies that have already been pre-impregnated, and then to polymerize the resin present in the stack as obtained in that way by performing heat temperature in an autoclave. In a variant, the fiber plies may be stacked while in the dry state and then the resin may be injected by the resin transfer molding (RTM) method or by the infusion method. The resin as injected in that way is then polymerized by heat treatment. Such stratified structures can nevertheless present mechanical properties that are not optimum.

Specifically, stratified structures (0°, 90°) may fail to transfer transverse loads or shear between laminations in full, in particular because of edge effects, thereby leading to early initiation of delamination and causing the structure to collapse.

In order to reduce such sensitivity to delamination, it is possible to use so-called "quasi-isotropic" stratified structures that present plies at 45°, specifically for the purpose of reducing edge effects and of raising the level at which initiation occurs.

Nevertheless, the advantage of composite materials is to have fibers extending in the same direction as forces, and to adapt its stiffness to extend in the same direction. The above-mentioned quasi-isotropic stratified structures do not make it possible to maximize the number of fibers in a given direction, so their mechanical properties can therefore be improved.

There therefore exists a need for novel parts made of a composite material that presents improved mechanical properties.

OBJECT AND SUMMARY OF THE INVENTION

To this end, in a first aspect, the invention provides a composite material part comprising at least:

a fiber preform forming fiber reinforcement comprising, in particular consisting in, a stack of at least two fiber plies, each of the fiber plies being made of an interlock weave three-dimensional fabric and each of the fiber plies having a number of warp yarn layers or a number of weft yarn layers that is greater than or equal to three; and a matrix present in the pores of the fiber preform.

The term "three-dimensional fabric" or "3D fabric" is used herein to mean a fabric in which at least some of the warp yarns link together weft yarns over a plurality of weft layers. The term "interlock weave" is used herein to mean a 3D weave in which each warp layer links together a plurality of weft layers with all of the yarns in a given warp column having the same movement in the weave plane. The definitions for three-dimensional fabric and interlock fabric, apply equally well when interchanging roles between warp and weft, so such an interchange should be considered as being covered by the claims.

In the invention, the stack is made by superposing a plurality of fiber plies and, consequently, it differs from a stack obtained by rolling a single fiber ply. Thus, the yarns of a first fiber ply in the stack do not extend into any second fiber ply of the stack other than the first. In particular, the plies of the stack are not woven together.

The invention relies on making use in the fiber reinforcement of the part of a particular stack of fiber plies making it possible firstly to control cracking mechanisms, and secondly to avoid the phenomenon of delamination while the part is in service.

The fact that each ply has at least three layers of warp yarns or of weft yarns together with interlock type 3D weaving makes it possible to give them a "damageable" nature. In a damageable ply, any cracks that appear in the matrix present propagation that is limited, with the propagation of such cracks being impeded by the neighboring fibers.

Various tests have been carried out by the inventor in order to evaluate the strength of various types of fiber reinforcement, and the following observations have been made. When the fiber reinforcement is formed by a stack of two-dimensionally woven plies (not in the invention), the energy needed for a crack to propagate within the part is relatively low, being of the order of 500 joules per square meter ($J/m^2$) to 600 $J/m^2$. Cracks can propagate in such structures relatively easily, which can lead to early delamination of the laminated structure. Another test was performed in which the fiber reinforcement was made of a single ply of three-dimensional fabric (not in the invention). That test overcame the problem of delamination and increased the energy needed for enabling a crack to propagate up to values of the order of 4000 $J/m^2$. Under such circumstances, crack propagation leads to damage of the ply. In the invention, at least two fiber plies are stacked, each being made of interlock weave three-dimensional fabric. In the invention, particularly high values are obtained for crack propagation energy, more than 6000 J/m². The invention thus makes it possible to obtain fiber reinforcement that does not delaminate, limiting crack propagation as much as possible and thus conferring improved mechanical properties to the material. It has thus been observed in unexpected manner that stacking three-dimensional fiber plies as is done in the invention serves to significantly improve the mechanical strength of the part compared with using a single piece of three-dimensional fiber reinforcement.

Parts of the invention thus present mechanical properties that are significantly improved, while presenting weight that is equivalent and possibly even lighter than the weight of prior art parts. The fact of stacking a plurality of fiber plies so as to form a fiber preform is also advantageous when forming parts of large dimensions which can be difficult to make by three-dimensionally weaving fiber block in a single-piece.

In an embodiment, the fiber preform may include at least three fiber plies.

In an embodiment, at least one of the stacked fiber plies may include yarns having different weights. For example, each of the stacked fiber plies may include yarns of different weights.

Varying the weight of the yarns present in the stacked fiber plies may serve for example to obtain local extra thickness in one or more zones of the fiber preform.

In an embodiment, the number of stacked fiber plies may be constant over the entire zone covered by the stack.

In an embodiment, the number of stacked fiber plies may vary over the zone covered by the stack.

By way of example, varying the number of stacked fiber plies can make it possible to obtain local extra thickness in one or more zones of the fiber preform.

In an embodiment, the part may constitute an aeroengine casing.

The present invention also provides a method of fabricating a part as defined above, the method including the following steps:

forming a matrix in the pores of a fiber preform comprising, in particular consisting in, a stack of at least two fiber plies, each of the fiber plies being made of an interlock weave three-dimensional fabric and each of the fiber plies having a number of warp yarn layers or a number of weft yarn layers that is greater than or equal to three.

By way of example, the matrix may be formed by injecting a resin into the pores of the fiber preform.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

The field of application of the invention relates in particular to parts made of composite material and presenting a resin type matrix for composite materials that are used at relatively low temperatures, typically up to 300° C., or else of a refractory material such as carbon or a ceramic material when making thermostructural composites.

Figure 1:
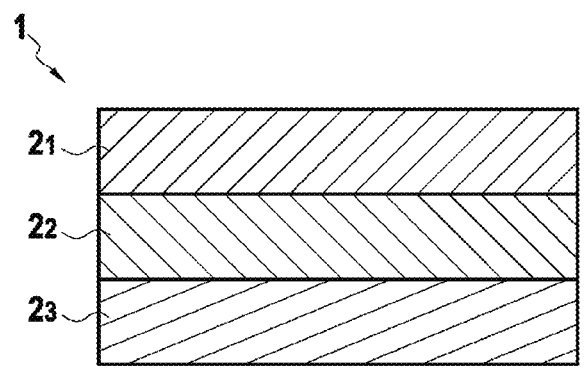
FIG. 1 is a highly diagrammatic fragmentary view of a first example of a fiber preform suitable for constituting the fiber reinforcement of a part of the invention.

FIG. 1 shows a stack 1 of three distinct fiber plies $2_1$, $2_2$, and $2_3$ forming a fiber preform suitable for constituting the fiber reinforcement of an example part of the invention. Each of the fiber plies $2_1$, $2_2$, and $2_3$ is made of interlock weave three-dimensional fabric and each of the fiber plies $2_1$, $2_2$, and $2_3$ has a number of warp yarns or a number of weft yarns that is greater than or equal to three. It is possible that at least one of the fiber plies $2_1$, $2_2$, and $2_3$, and possibly each of them, presents both a number of warp yarn layers that is greater than or equal to three and a number of weft yarn layers that is greater than or equal to three. Advantageously, the fibers in each of the fiber plies $2_1$, $2_2$, and $2_3$ may extend substantially in the same direction. A unidirectional fiber ply may optionally be present between two adjacent fiber plies $2_1$, $2_2$, and $2_3$. The fiber plies $2_1$, $2_2$, and $2_3$ are not woven together. The fiber plies $2_1$, $2_2$, and $2_3$ are not woven together over the entire width or over the entire length of the fiber preform. The fiber preform thus does not have any zone in which a layer of yarns from a first ply is woven together with a layer of yarns from a second ply that is distinct from the first ply. In particular, throughout the fiber preform, there is no layer of warp yarns of the first ply woven together with a layer of weft yarns of the second ply. Throughout the fiber preform, there is no layer of weft yarns of the first ply that is woven together with warp yarns of the second ply.

As mentioned above, the stack 1, as shown, is made by superposing a plurality of fiber plies $2_1$, $2_2$, and $2_3$ and, consequently, it is different from a stack obtained by rolling a single fiber ply.

Figure 2:
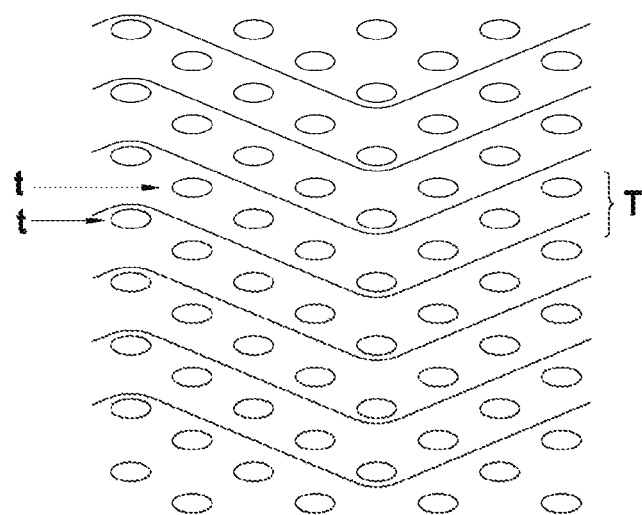
FIG. 2 shows an interlock three-dimensional weave plane.

Each of the stacked fiber plies $2_1$, $2_2$, and $2_3$ is made of interlock weave fabric. FIG. 2 is a view showing a plane of an interlock weave having seven warp yarns and eight weft yarns and that is suitable for making the stacked fiber plies $2_1$, $2_2$, and $2_3$. In the interlock weave shown, a weft layer T is made up of two adjacent weft half-layers t that are offset relative to each other in the warp direction. There are thus 16 weft half-layers in a staggered configuration. Each warp yarn links together three weft half-layers. It is also possible to adopt a weft configuration that is not staggered, the weft yarns of two adjacent weft layers being in alignment in the same columns. Suitable interlock type weaves are described in Document WO 2006/136755.

By way of example, the fibers forming the stacked fiber plies may be made of ceramic material, e.g. of silicon carbide, of carbon, or of an oxide, e.g. of alumina. The fibers forming the stacked fiber plies $2_1$, $2_2$, and $2_3$ may all be of the same chemical nature. In a variant, the stacked fiber plies $2_1$, $2_2$, and $2_3$ may include fibers of different chemical natures. In the example shown, the number of stacked fiber plies is constant over the entire zone covered by the stack, specifically three.

The example shows a stack 1 having three stacked fiber plies $2_1$, $2_2$, and $2_3$. Naturally, it would not go beyond the ambit of the invention for the stack to have two fiber plies or more than three stacked fiber plies.

Figure 3:
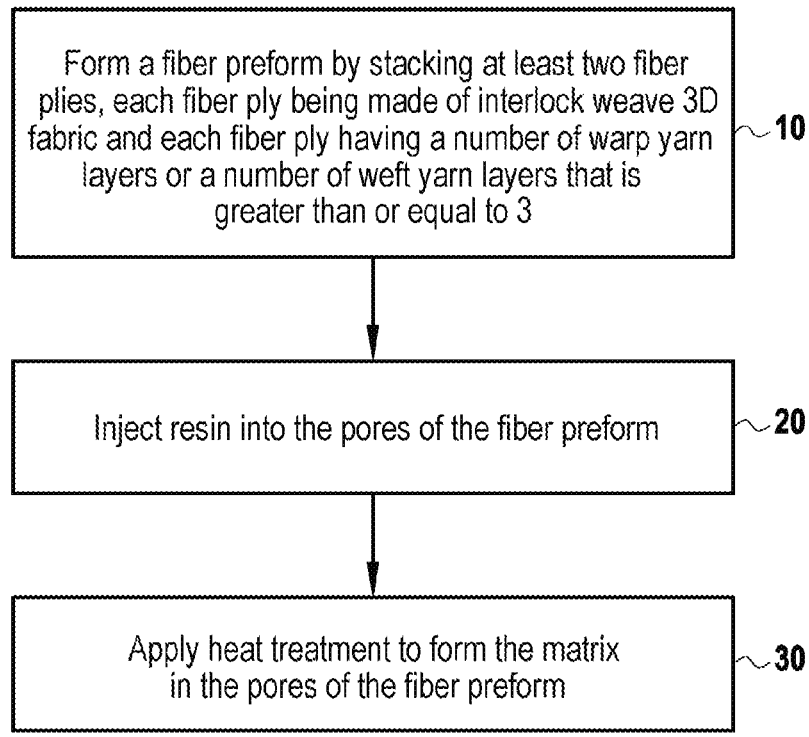
FIG. 3 is a flow chart showing the various steps of a method of fabricating a composite material part of the invention.

FIG. 3 is a flow chart of an example method of fabricating a part of the invention. In a first step 10, at least two fiber plies are stacked, each of these fiber plies being made of an interlock weave three-dimensional fabric and each of these fiber plies having a number of warp yarn layers or a number of weft yarn layers that is greater than or equal to three. The stacked plies are not woven with one another. During step 10, the plies may be stacked in the dry state and they may be placed in a mold in order to shape the fiber preform. Under such circumstances, a resin is injected into the pores of the fiber preform during a step 20, the resin subsequently being polymerized during a step 30 by being subjected to heat treatment in order to form the matrix in the pores of the fiber preform. In a variant, it is possible to stack fiber plies that have already been pre-impregnated and to perform heat treatment in order to obtain a part of the invention.

Figure 4:
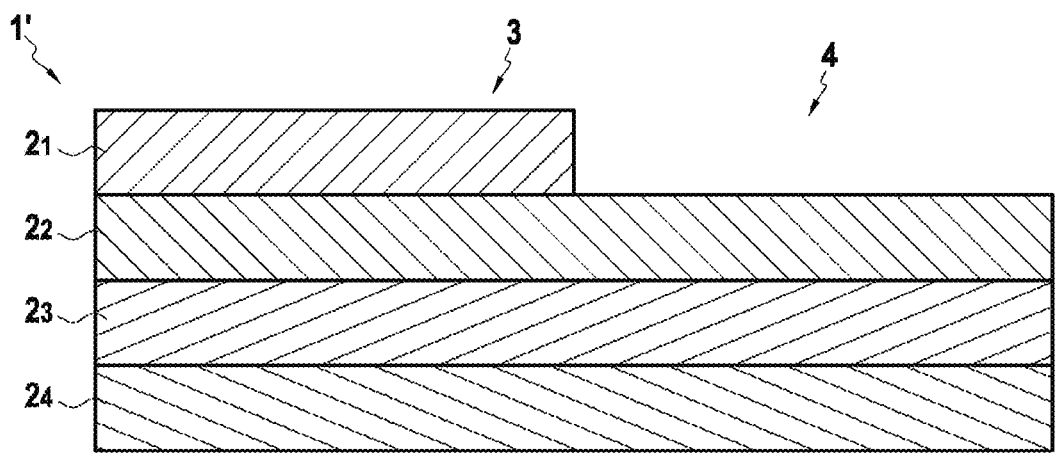
FIG. 4 is a highly diagrammatic and fragmentary view of a second example of a fiber preform suitable for constituting the fiber reinforcement of a part of the invention.

FIG. 4 shows a second example of a stack 1' of stacked fiber plies $2_1$, $2_2$, $2_3$, and $2_4$ forming a fiber preform suitable for constituting the fiber reinforcement of a part of the invention. The example stack 1' shown in FIG. 4 has a first region 3 of the stack with a number of stacked fiber plies (four fiber plies) that is different from the number of stacked fiber plies in a second region 4 of the stack where only three fiber plies are present. Such variations in the number of fiber plies in the stack 1' may serve to obtain local extra thickness, as shown.

The term "lying in the range . . . to . . . " should be understood as including the bounds.

The invention claimed is:

1. A composite material part comprising:
 a fiber preform forming fiber reinforcement comprising a stack of at least two fiber plies that are not woven together, each of the fiber plies being made of an interlock weave three-dimensional fabric and each of the fiber plies having a number of warp yarn layers or a number of weft yarn layers that is greater than or equal to three; and
 a matrix present in the pores of the fiber preform.

2. A part according to claim 1, wherein at least one of the stacked fiber plies includes yarns having different weights.

3. A part according to claim 1, wherein the number of stacked fiber plies is constant over the entire zone covered by the stack.

4. A part according to claim 1, wherein the number of stacked fiber plies varies over the zone covered by the stack.

5. A part according to claim 1, wherein the part constitutes an aeroengine casing.

6. A method of fabricating a part according to claim 1, the method comprising:
 forming a matrix in the pores of a fiber preform comprising a stack of at least two fiber plies that are not woven together, each of the fiber plies being made of an interlock weave three-dimensional fabric and each of the fiber plies having a number of warp yarn layers or a number of weft yarn layers that is greater than or equal to three.

7. A part according to claim 1, wherein each of the fiber plies has a number of warp yarn layers or a number of weft yarn layers that is greater than three.

8. A part according to claim 1, wherein at least one of the fiber plies presents both a number of warp yarn layers that is greater than or equal to three and a number of weft yarn layers that is greater than or equal to three.

* * * * *